United States Patent [19]

Simmons

[11] 4,068,471

[45] Jan. 17, 1978

[54] VARIABLE CYCLE ENGINE WITH SPLIT FAN SECTION

[75] Inventor: John Robert Simmons, Cincinnati, Ohio

[73] Assignee: General Electric Company, Lynn, Mass.

[21] Appl. No.: 587,134

[22] Filed: June 16, 1975

[51] Int. Cl.² .............................................. F02K 3/06
[52] U.S. Cl. ..................................... 60/262; 60/39.23
[58] Field of Search ................... 60/226 R, 262, 39.23

[56] References Cited

U.S. PATENT DOCUMENTS

| 3,238,716 | 3/1966 | Sandre .................................. 60/262 |
| 3,368,352 | 2/1968 | Hewson ............................... 60/226 R |
| 3,528,241 | 9/1970 | Venable et al. ...................... 60/226 R |
| 3,638,428 | 2/1972 | Shipley et al. ....................... 60/226 R |
| 3,688,504 | 9/1972 | Hutchinson et al. ............... 60/226 R |
| 3,841,091 | 10/1974 | Sargisson et al. ................. 60/226 R |

FOREIGN PATENT DOCUMENTS

| 1,085,619 | 10/1967 | United Kingdom ................... 60/226 |
| 971,443 | 9/1964 | United Kingdom ................... 60/226 |

*Primary Examiner*—William L. Freeh
*Assistant Examiner*—Robert E. Garrett
*Attorney, Agent, or Firm*—James W. Johnson, Jr.; Derek P. Lawrence

[57] ABSTRACT

The fan section of a gas turbine engine is divided into a front section and an aft section axially displaced downstream of the front fan section. A duct is provided for bypassing the inlet gas stream around a gas generator. The bypass duct has a first inlet disposed intermediate the front and aft fan sections and a second inlet disposed downstream of the aft fan section. In order to provide increased flexibility in modulating the engine bypass ratio, a diverter valve is provided downstream of the aft fan section to selectively distribute the airflow exhausted from the front fan section between the aft fan section and bypass duct and to selectively distribute the air exhausted from the aft fan section between the bypass duct and gas generator.

7 Claims, 2 Drawing Figures

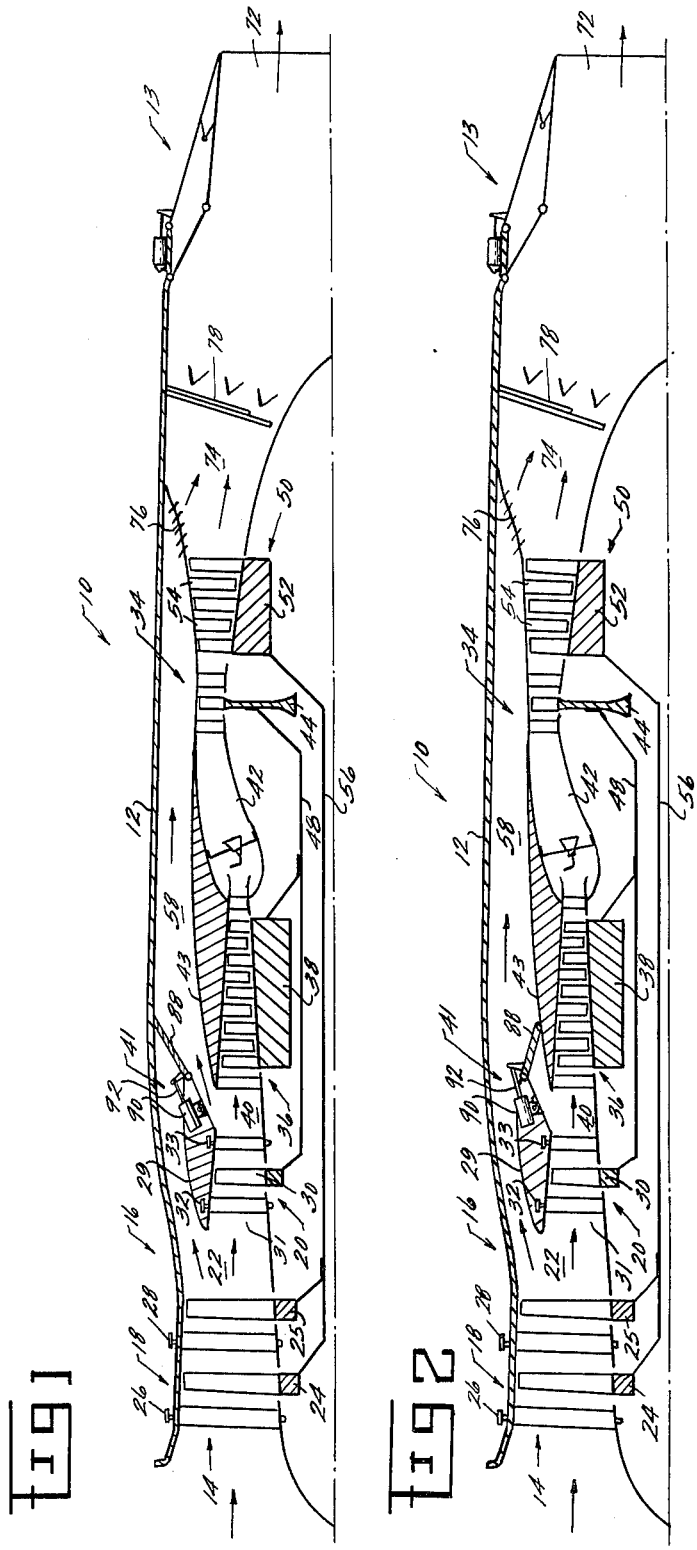

VARIABLE CYCLE ENGINE WITH SPLIT FAN SECTION

BACKGROUND OF THE INVENTION

This invention relates to a gas turbine engine and, more particularly, to a novel arrangement for the fan section thereof.

Considerable attention has been devoted to developing a gas turbine engine with the high specific thrust characteristics of a turbojet or low bypass turbofan at supersonic speeds which can also be configured to exhibit the lower specific thrust, low noise, and low fuel consumption characteristic of a high bypass turbofan at subsonic speeds, in order that a mixed-mission aircraft may be developed. Such engines are generally referred to as variable cycle engines.

Several design approaches for a variable cycle engine have been developed. Thus, it has been proposed to increase the flow flexibility of a gas turbine engine by splitting the fan into two sections and providing a variable position duct intermediate the two sections, thereby to cause the flowpath between the forward and aft fan sections to be either in serial or parallel. While providing an increased margin of flow variability, engines of these types still lack sufficient flow flexibility to provide efficient operation over widely varying thrust levels and bypass ratios.

It has also been proposed to increase the flow modulation potential of a gas turbine engine by splitting the fan into two sections and placing each section in flow communication with a separate concentric bypass duct, each having a separate exhaust nozzle system. One problem associated with these and other prior art variable cycle engines of the split fan variety is the high cost and complexity resulting from utilization of multiple bypass ducts and exhaust nozzle systems.

SUMMARY OF THE INVENTION

It is, therefore, the primary object of the present invention to provide an improved gas turbine engine of the bypass type capable of operating over a wide range of thrust levels and bypass ratios.

It is also an object of this invention to provide a gas turbine engine having a single bypass duct, a split fan section and including a diverter valve for distributing the inlet gas flow between the fan sections, bypass duct, and gas generator.

These and other objects of the invention have been achieved in the preferred embodiment of the invention wherein the fan section of a gas turbin engine is divided into a front section and an aft section axially displaced downstream of the front fan section. A duct is provided for bypassing air around a gas generator. The bypass duct has a first inlet disposed intermediate the front and aft fan sections and a second inlet disposed downstream of the aft fan section. A low pressure turbine is provided downstream of the core engine to supply rotational energy to the front fan section. Preferably, the fan workload is shared by connecting the aft fan section to the high pressure turbine of the gas generator in the manner disclosed in copending U.S. patent application, Ser. No. 587,135 filed by J. Simmons on June 16, 1975.

A multi-positioned diverter valve is provided downstream of the aft fan section in order to modulate the engine bypass ratio. The diverter valve may be moved between a first position in which all of the airflow from the front fan section is directed to the aft fan section and thereafter divided between the bypass duct and gas generator to a second position in which the airflow from the front fan section is divided between the bypass duct and aft fan section and all of the air exhausted from the aft fan section is directed to the gas generator, as well as to all positions intermediate the first and second positions. Configured in this manner, the gas turbine engine of this invention achieves a high degree of flow flexibility with only a single bypass duct and a single diverter valve. By disposing the diverter valve downstream of the aft fan section, the engine of this invention achieves greater flexibility in controlling the pressure level in the bypass duct than has been achieved in prior art single bypass variable cycle engines. By moving the diverter valve to the first position, the bypass duct airflow is compressed by both the front and aft fan sections. Similarly, by moving the diverter valve to the second position, the airflow to the bypass duct is compressed by only the front fan section. Further, because the diverter valve may be moved intermediate the first and second positions, the pressure level of the bypass duct flow may be controlled directly as a function of the rotational position of the diverter valve and thereby permit the engine of this invention to achieve a high degree of flow modulation without the use of multiple bypass ducts and multiple nozzle systems.

BRIEF DESCRIPTION OF THE DRAWINGS

The invention may be better understood upon reading the following description of the preferred embodiment in conjunction with the accompanying drawings in which:

FIG. 1 is a cross-sectional view of a split fan bypass gas turbine engine incorporating the diverter valve of this invention in a high bypass mode of operation.

FIG. 2 is a cross-sectional view of a split fan bypass gas turbine engine incorporating the diverter valve of this invention in a low bypass mode of operation.

DESCRIPTION OF THE PREFERRED EMBODIMENT

Referring to FIG. 1, there is shown a gas turbine engine 10 having an outer casing or nacelle 12 circumscribing and spaced apart from a gas generator 34 so as to form a bypass duct 58 around the gas generator 34. The nacelle 12 extends upstream of the gas generator 34 to form an inlet 14 to the engine 10 and downstream of the gas generator 34 to provide an exhaust system 13 for the engine 10. The inlet 14 is sized to provide a predetermined design mass airflow to the engine 10. Disposed in the inlet 14 is a fan shown generally at 16 for receiving and compressing the airflow delivered to the inlet 14. The fan 16 includes a front section 18 axially displaced from an aft section 20 by an axial space designated generally at 22. This arrangement is similar to that disclosed in U.S. patent application, Ser. No. 445,438 filed by Bernard L. Koff et al. on Feb. 25, 1974, and assigned to the same assignee as this invention. An intermediate nacelle 29 is spaced radially inward from the outer nacelle 12 to provide an intermediate passageway 31 interior thereto for receipt of the aft fan section 20. The intermediate nacelle 29 has its upstream end disposed in the axial space 22 between the front and aft fan sections and has a downstream end terminating approximately coplanar with but spaced radially outward from the inlet to the gas generator 34. In this manner, air entering the engine inlet 14 is first compressed by the front fan section 18 and thereafter divided between the bypass duct 58 and the intermediate passageway 31, and the airflow exhausted from the intermediate passageway 31 is divided between the bypass duct 58 and the gas generator 34.

Front fan section 18 includes a plurality of rotor blades 24 and 25 interspaced between variable inlet guide vane 26 and variable stator vane 28 suspended from the engine outer casing 12. The aft fan section 20 includes rotor blade 30 and interspaced between variable stator vanes 32 and 33 suspended from the intermediate nacelle 29.

The gas generator 34 includes a compressor 36 having a rotor 38. Pressurized air entering the compressor 36 through a flow annulus 40 is compressed and then discharged to a combustor 42 where fuel is burned to provide the high energy combustion gases which drive the high pressure turbine rotor 44. The high pressure turbine rotor 44 extracts energy from the high pressure gas stream exiting the combustor 42 and converts some of this energy into shaft horsepower for driving the rotor stages 38 of the compressor 36 through an upstream extending driveshaft 48 connected for rotation with the rotors 38 and 44.

Disposed downstream of the high pressure turbine rotor 44, in a position to receive the flow of hot gases leaving the gas generator 34, is a low pressure turbine shown generally at 50. The low pressure turbine 50 includes a rotor section 52 having a plurality of rotor blades interspaced between stator blades 54. The low pressure turbine 50 converts energy from the high pressure gases exiting the high pressure turbine into shaft horsepower and delivers this power to the front fan section 18 through an upstream extending driveshaft 56 connected for rotation with rotors 24, 25 and 52. The shaft 48 driven by the high pressure turbine rotor 44 is extended upstream of the gas generator compressor rotor 38 and interconnected with the aft fan rotor 30 so as to supply rotational energy to the aft fan section 20 and thereby assist in the fan workload as described in the above referenced Simmons application, serial number.

The gas flow exhausted from the bypass duct 58 is intermixed with the exhaust from the gas generator 34 in the region shown generally at 74 downstream of the low pressure turbine 50. For this purpose, a suitable mixer shown generally at 76 is provided at the downstream end of the bypass duct 58. The mixer 76 may be of any suitable type well known in the art. For example, the mixer may be of the convoluted type comprising a plurality of alternating cold and hot chutes having the cold chutes in flow communication with the bypass duct 58 and the hot chutes in flow communication with the gas generator 34. The mixer is preferably of the variable geometry type as disclosed in U.S. patent application, Ser. No. 583,055, filed by D. J. Rundell et al. on June 2, 1975, in which the area to which the bypass stream is injected into the cold stream may be varied in order to assist in adjusting the engine bypass ratio.

In order to deliver propulsive force to the engine, a variable area diverging/converging exhaust nozzle system shown generally at 72 is provided at the downstream end of the outer nacelle 12 to exhaust the combined flows exiting the mixer 76. To further increase engine thrust at high mach numbers, an afterburner shown generally at 78 may be provided intermediate the mixer 76 and nozzle 72.

Engines configured in this manner have a high degree of flow modulation. The position of the inlet to the bypass duct 58 and the inlet to the aft fan section 20 downstream of the front fan section 18, and the position of the second inlet to the bypass duct 58 and the inlet to the gas generator 34 downstream of the aft fan section 20 combine with the variable inlet guide vanes and variable stator geometry of the front and aft fan sections to permit the total inlet airflow to be divided between the bypass duct 58 and the gas generator 34 in varying proportions and at varying pressure levels so that the engine bypass ratio may be varied over a wide range while maintaining the total engine inlet airflow matched to an optimum design level. More particularly, increasing the proportion of total inlet airflow which is directed to the bypass duct 58 while reducing flow to the gas generator 34 results in a higher engine bypass ratio. Similarly, decreasing proportional total inlet airflow to the bypass duct 58 while increasing the airflow to the gas generator 34 results in a lower bypass ratio.

To further assist in adjusting the bypass ratio of this invention, an annular diverter valve shown generally at 41 is provided. The diverter valve 41 comprises an annular hinged flap 88 pivotally mounted to the downstream end of the intermediate nacelle 29 and extending downstream into the bypass duct 58. Suitable actuator means which may comprise a linear actuator 90 having a control arm 92 in driving engagement with the annular hinged flap 88 is provided to rotate the flap 88 about the downstream end of the intermediate nacelle 29. The diverter valve 41 is disposed to be moved between a first position as shown in FIG. 1 in which the downstream end of the flap 88 abuts the inner wall of the engine outer casing 12, to a second position as illustrated in FIG. 2 in which the downstream end of the flap 88 abuts the outer wall of the engine inner nacelle 43, including all positions intermediate the first and second positions. In the first position, as illustrated in FIG. 1, the diverter valve 41 obtrudes the bypass duct 58 at a point downstream of the intermediate passageway 31 such that the total airflow exhausted from the front fan section 18 is directed to the intermediate passageway 31 and compressed by aft fan section 20. Thereafter, the air exiting the intermediate passageway 31 is divided between the bypass duct 58 and the gas generator 34. In the second position, as illustrated in FIG. 2, the diverter valve 41 obtrudes flow from the intermediate passageway 31 to the bypass duct 58 while simultaneously permitting flow exhausted from the front fan section 18 to be divided between the bypass duct 58 and the intermediate passageway 31. This arrangement permits the pressure level of the bypass duct flow to be controlled directly as a function of the rotational position of the diverter valve 44 and thereby permits a high degree of flow modulation without the use of a double bypass duct arrangement as in prior art variable cycle engines.

While the preferred embodiment of this invention as illustrated in FIG. 1 has the aft fan spool 30 coupled directly to the high pressure turbine through the driveshaft 48, it is also possible to operate this engine in a conventional manner by coupling the aft fan section to the driveshaft 56 of the low pressure turbine 50. Alternatively, the aft fan section 20 may be driven by a separate third low pressure turbine and driveshaft (not shown).

The increased flow modulation resulting from the diverter valve 41 permits the engine to operate over a wide range of engine bypass ratios and thrust levels while maintaining the inlet airflow matched to an optimum design level throughout. Prior art mixed flow engines have not operated efficiently throughout a variable thrust range because they experience significantly high inlet drag levels during low thrust flight. Typically, the inlet of a gas turbine engine is sized to be full at the maximum thrust of the engine. However, as engine thrust is decreased below the maximum thrust, the engine airflow demand is considerably less than the total airflow supplied to the inlet. This excess airflow to the inlet causes inlet spillage drag which has significantly increased the installed fuel consumption of prior art mixed flow engines. The flow variability afforded by this invention permits the airflow to the engine inlet 14 to be maintained at a matched design level throughout a wide range of engine thrust levels and bypass ratios thereby avoiding the inlet spillage drag associated with the prior art mixed flow engines and significantly increasing installed fuel consumption.

Various changes could be made in the embodiment shown in FIGS. 1 and 2 without departing from the scope of this invention. Thus, further flow variability could be achieved by increasing the number of fan stages and inlets to the bypass duct 58. In addition, exhaust nozzle systems other than those illustrated may be utilized. Further, the mixer 76 may be replaced with a diverter valve system as disclosed in U.S. patent application, Ser. No. 583,056 filed by J. E. Johnson et al., on June 2, 1975. For simplicity in design, the number of variable geometry components illustrated in the above embodiment have been kept to the minimum necessary to achieve a desired degree of flow valiability; however, it is also possible to utilize other variable geometry components to provide a greater degree of flow modulation. Thus, the compressor low pressure turbine and high pressure turbine may be equipped with additional variable stator blades or variable rotor blades or a variable nozzle diaphragm may be provided intermediate the high and low pressure turbines.

Therefore, having described the preferred embodiment of the invention, though not exhaustive of all possible equivalents, what is desired to be secured by letters patent of the United States is claimed below.

What is claimed is:

1. An improved variable cycle gas turbine engine of the type having an inlet for supplying a gas flow to a gas generator comprising a compressor, a combustor, and a high pressure turbine in serial flow relation, wherein the improvement comprises:
    a fan disposed in the inlet having a front section for receiving and compressing the total inlet airflow and an aft section axially displaced downstream from the front fan section,
    duct means for bypassing a portion of the inlet gas flow around the aft fan section and gas generator, and
    diverter valve means disposed intermediate the aft fan section and gas generator for controlling the amount of gas flow from the front fan section to the bypass duct means, aft fan section and gas generator and movable between a first position in which the total gas flow exiting the front fan section is directed to and compressed by the aft fan section and the airflow exiting the aft fan section is divided between the bypass duct means and gas generator, and a second position in which the gas flow exiting the front fan section is divided between the bypass duct means and aft fan section, and the total gas flow exiting the aft fan section is directed to the gas generator.

2. The gas turbine engine of claim 1 wherein: the bypass duct means is movable to all positions intermediate the first and second positions.

3. A variable cycle gas turbine engine comprising:
    a gas generator comprising a compressor, combustor, and high pressure turbine in serial flow relation, all circumscribed by an inner nacelle,
    an outer nacelle circumscribing and spaced apart from the inner nacelle so as to form a bypass duct around the gas generator and extending upstream of the inner nacelle to form the inlet to the engine and downstream of the inner nacelle to provide an exhaust system for the engine,
    a front fan section disposed in the inlet for compressing the total inlet gas flow,
    an intermediate nacelle spaced radially inward from the outer nacelle and disposed intermediate and axially spaced apart from the front fan section and inner nacelle to form an intermediate passageway therethrough whereby the gas flow exhausted from the front fan section is divided between the bypass duct and intermediate passageway and the gas flow exhausted from the intermediate passageway is divided between the gas generator and bypass duct,
    an aft fan section disposed in the intermediate passageway for compressing the gas flow therethrough, and
    diverter valve means rotatably disposed about the downstream end of the intermediate nacelle and movable between positions to selectively abutt the inner and outer nacelles for selectively controlling the amount of gas flow from the front fan section to the bypass duct and intermediate passageway and the amount of gas flow from the intermediate passageway to the bypass duct and gas generator.

4. The gas turbine engine of claim 3 when the diverter valve means is movable between a first position in which the total gas flow exiting the front fan section is directed to the intermediate passageway and the gas flow exiting the intermediate passageway is divided between the bypass duct and gas generator, and a second position in which the gas flow exiting the front fan section is divided between the bypass duct and intermediate passageway and the total gas flow exiting the intermediate passageway is directed to the gas generator.

5. The gas turbine engine of claim 4 wherein the diverter valve means comprises:
    a rotatable hinged flap pivotally secured to the downstream end of the intermediate nacelle and extending into the bypass duct so as to obtrude the bypass duct at a point downstream of the aft fan section when the diverter valve is in the first position and to obtrude flow between the intermediate passageway and the bypass duct when the diverter valve is in the second position, and
    a linear actuator having a control arm in driving engagement with the flap for rotating the flap about the downstream end of the intermediate nacelle between the first and second positions.

6. The variable cycle engine of claim 5 further comprising:
    a variable area exhaust nozzle secured to the downstream end of the outer nacelle, and a variable area mixer disposed intermediate the gas generator and exhaust nozzle for combining the gas generator and bypass duct exhaust streams.

7. The gas turbine engine of claim 6 futher comprising:

a low pressure turbine disposed downstream of and in serial flow relation with the gas generator for supplying rotational energy to the front fan section, and wherein the rotational energy to the aft fan section is supplied through a driveshaft interconnecting the aft fan section and high pressure turbine.

* * * * *